(12) United States Patent
Lowell

(10) Patent No.: US 6,168,545 B1
(45) Date of Patent: Jan. 2, 2001

(54) LIMITED SLIP DIFFERENTIAL WITH SPRING-LOADED CLUTCHES

(75) Inventor: Jeffrey Lowell, Ventura, CA (US)

(73) Assignee: McLaren Automotive Group, Inc., Livonia, MI (US)

( * ) Notice: Under 35 U.S.C. 154(b), the term of this patent shall be extended for 0 days.

(21) Appl. No.: 09/320,635

(22) Filed: May 26, 1999

(51) Int. Cl.⁷ ........................................ F16H 1/44
(52) U.S. Cl. .............................. 475/231; 475/235
(58) Field of Search ............................ 475/86, 89, 90, 475/92, 230, 231, 233, 235

(56) References Cited

U.S. PATENT DOCUMENTS

| | | |
|---|---|---|
| 2,949,792 | 8/1960 | Smith . |
| 3,724,289 | 4/1973 | Kennicutt . |
| 5,059,160 | 10/1991 | Raniero . |
| 5,215,506 * | 6/1993 | Hara ........................................ 475/86 |
| 5,299,986 | 4/1994 | Fabris et al. . |
| 5,310,388 | 5/1994 | Okcuoglu et al. . |
| 5,536,215 | 7/1996 | Shaffer et al. . |
| 5,595,214 | 1/1997 | Shaffer et al. . |
| 5,611,746 | 3/1997 | Shaffer . |
| 5,938,556 * | 8/1999 | Lowell ..................................... 475/89 |

FOREIGN PATENT DOCUMENTS

| | | |
|---|---|---|
| 58-221046 | * 12/1983 | (JP) . |
| 61-67629 | * 4/1986 | (JP) . |
| 2-176236 | * 7/1990 | (JP) . |
| 9-60710 | * 3/1997 | (JP) . |
| 11-182650 | * 11/1997 | (JP) . |
| 7-293665 | * 11/1997 | (JP) . |

* cited by examiner

Primary Examiner—Khoi Q. Ta
(74) Attorney, Agent, or Firm—Bliss McGlynn, P.C.

(57) ABSTRACT

A limited slip differential for use with an automotive vehicle comprising differential gearing including a pair of differential side gears, one side gear being connected to each of two axle shafts for vehicle traction wheels, a differential carrier housing supporting differential pinions engageable with the side gears, the differential carrier being connected drivably through a drive shaft to the vehicle engine, first and second clutches connecting the differential carrier with each side gear, a mechanical cam mechanism for transferring a clutch-engaging force from the carrier to each of the clutches, thereby establishing a mechanical torque bias in the differential mechanism, and a clutch spring acting on each clutch to partially engage the clutches whereby the clutch-engaging force increases as a function of engine throttle position at a first rate for low engine throttle settings and at a higher rate for advanced engine throttle settings.

8 Claims, 5 Drawing Sheets

LIMITED SLIP DIFFERENTIAL WITH SPRING-LOADED CLUTCHES

TECHNICAL FIELD

This invention relates to geared automotive differential mechanisms for transferring torque from a vehicle engine to each of two vehicle traction wheels.

BACKGROUND ART

Differential mechanisms commonly used in automotive vehicle drivelines are capable of transferring driving torque from an engine-driven drive shaft to each of two axle half shafts for the vehicle traction wheels. The differential mechanism typically comprises a differential carrier housing that is driven by a pinion connected drivably to the torque output element of a multiple-ratio, geared transmission. Differential pinions in the differential carrier housing drivably engage side gears, one side gear being connected drivably to the inboard end of one axle half shaft, and the other side gear being drivably connected to the inboard side of the other axle half shaft.

In the case of a limited slip differential, it is known design practice to use a friction clutch for establishing a mechanical torque bias. Friction elements of the clutch are carried by the differential carrier housing and by a differential side gear. It is preferable to provide a separate friction clutch for each of the two side gears. A spring is used for loading the friction elements of the differential clutches. This establishes friction torque bias which inhibits differential motion of the side gears for any torque value that is lower than a threshold breakaway torque.

In other known limited slip differential designs, the clutches are loaded by pressure rings situated within the differential carrier housing. The pressure rings rotate in unison with the housing, but they are adapted for axial adjustment within the housing as torque is delivered to the differential carrier. A differential pinion shaft engages a cam surface on the pressure rings so that an axial force is developed on the pressure rings, the magnitude of the force being proportional to the torque delivered to the carrier housing. The friction elements of the clutches are located symmetrically within the differential carrier housing. As torque is delivered to the carrier housing, a torque bias is established that is proportional to the transmitted torque. The torque bias in such differentials is determined by the number of clutch discs and by the geometry of the cam formed on the pressure rings.

U.S. patent application Ser. No. 09/114,505, filed Jul. 13, 1998, entitled "DIFFERENTIAL SPEED-SENSITIVE AND TORQUE-SENSITIVE LIMITED SLIP COUPLING", which is assigned to the assignee of the present invention, discloses a limited slip differential that includes a mechanical torque bias established by pressure rings and that also includes a hydrostatic, speed-sensitive torque bias. The speed-sensitive torque bias is established by a positive-displacement pump having driving and driven elements that are connected, respectively, to one of the side gears and to the differential carrier housing. Thus, when the differential side gear rotates relative to the carrier housing, hydrostatic torque resistance is established. That torque resistance creates a torque bias that complements the mechanical torque bias established by the pressure rings. The hydrostatic torque bias is speed-sensitive because the volume of hydrostatic pressure fluid displaced by the positive-displacement pump is proportional to the relative speeds of the differential carrier housing and the side gear.

DISCLOSURE OF INVENTION

The differential mechanism of the invention has features that are common to limited slip differential mechanisms of the type described in the preceding discussion. It includes a geared differential assembly including differential pinions and two side gears, one side gear being connected to each of two axle half shafts. A pair of cammed thrust rings or pressure rings is situated adjacent each of two friction clutch assemblies enclosed within the differential carrier housing. As in the case of the mechanical torque-sensitive bias feature described in application Ser. No. 09/114,505, the friction clutch discs of the present invention are frictionally engaged as torque is transmitted from the differential carrier through each of the side gears to the axle half shafts. The force acting on the friction discs through the cammed pressure rings is proportional to the torque being transmitted. The force of the pressure rings is opposed by a spring that establishes a preload on the friction disks. During operation of the vehicle driveline with relatively low engine throttle settings, the engaging force on the clutch friction elements increases at a relatively low rate as the force of the clutch spring is overcome. When the clutch spring is fully deflected as the engine throttle setting is advanced, the force applied to the clutch friction elements by the pressure rings increases at an increased rate. The presence of the spring, therefore, provides a delayed action in the buildup of a torque bias as the engine throttle is increased from a low setting to a wide-open setting.

When the limited slip differential of the present invention is used in a vehicle such as a racing vehicle, variable throttle settings are effected by the driver during turning maneuvers. It is common practice for the driver to relax the throttle setting as the vehicle enters a curve and to increase the throttle setting as the turning maneuver proceeds. In such a maneuver, the vehicle normally tends to understeer, especially when the driver advances the throttle setting from an intermediate value toward the wide-open throttle setting. By providing a modified rate of increase of the torque bias with increasing throttle setting throughout a range of throttle settings less than the intermediate value, and by providing an increased rate of increase of the torque bias at advanced throttle settings greater than the intermediate throttle setting, the driver has greater control of the vehicle during a powered turn because the understeering tendency is substantially reduced.

It is an objective of the invention to provide a limited slip differential that incorporates a changing rate of increase of the torque bias with increasing throttle settings. The invention accordingly comprises a geared differential mechanism with two side gears that distribute torque to the driver axle shafts, which are coaxially aligned. At least one planetary pinion engages each side gear. A carrier housing rotatably supports the pinion, and the carrier is driven by a torque input member.

At least one friction disc of a pair of friction clutches is secured to the carrier, and a companion disc is secured to a side gear. A cammed pressure ring is located in the carrier housing between the pinion and the side gear. Axial thrust forces developed by the pressure ring create a friction torque bias.

A spring in the carrier housing acts on the pressure ring for each clutch to oppose the thrust forces, thereby delaying the development of the friction torque bias. Provision is made for the spring to be bottomed out against the differential carrier housing when the torque sensitive force applied to the clutch disk assembly by the pressure ring exceeds an intermediate value that is less than the torque bias created when the engine operates near a wide-open throttle setting.

BEST MODE FOR CARRYING OUT THE INVENTION

Figure 1:
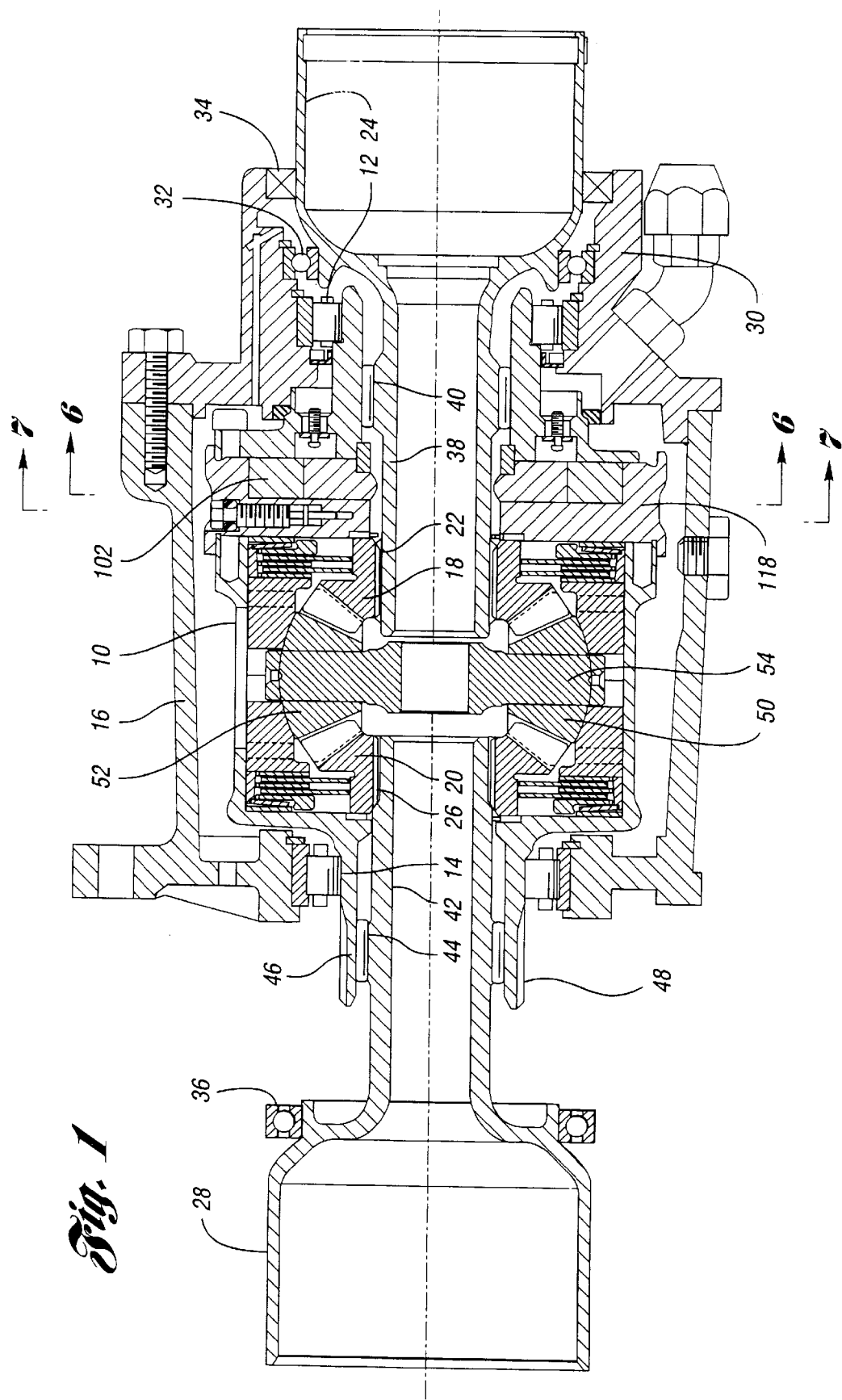
FIG. 1 is a cross-sectional assembly view of a differential mechanism embodying the invention.

FIG. 1 shows a cross-section of a geared differential mechanism embodying the improvements of the invention. A differential carrier housing 10 is journaled by spaced bearings 12 and 14 in a differential housing, generally indicated at 16. The carrier housing 10 encloses differential bevel side gears 18 and 20. Side gear 18 is drivably splined at 22 to a universal joint member 24, which establishes a driving connection between side gear 18 and the inboard end of an axle half shaft. Similarly, bevel side gear 20 is splined at 26 to universal joint member 28, which establishes a driving connection between bevel side gear 20 and the inboard end of a second axle half shaft. The universal joint member 24 is journaled in differential housing end plate 30 by bearing 32. A fluid seal 34 contains a lubricant within the differential housing 16. A bearing 36 journals the universal joint member 28.

The universal joint member 24 is connected to an internal torque output shaft 38, which is journaled in the carrier housing opening by bearing 40. Similarly, universal joint member 28 has an internal torque output shaft 42, which is journaled by bearing 44 in the opposite end opening of the differential housing 10.

The carrier housing 10 has an extension in the form of a sleeve shaft 46 in which the bearing 44 is situated. A crown gear or ring gear (not shown) can be splined to sleeve shaft extension 46, a driving spline on the sleeve shaft extension 46 being shown at 48.

Figure 3:
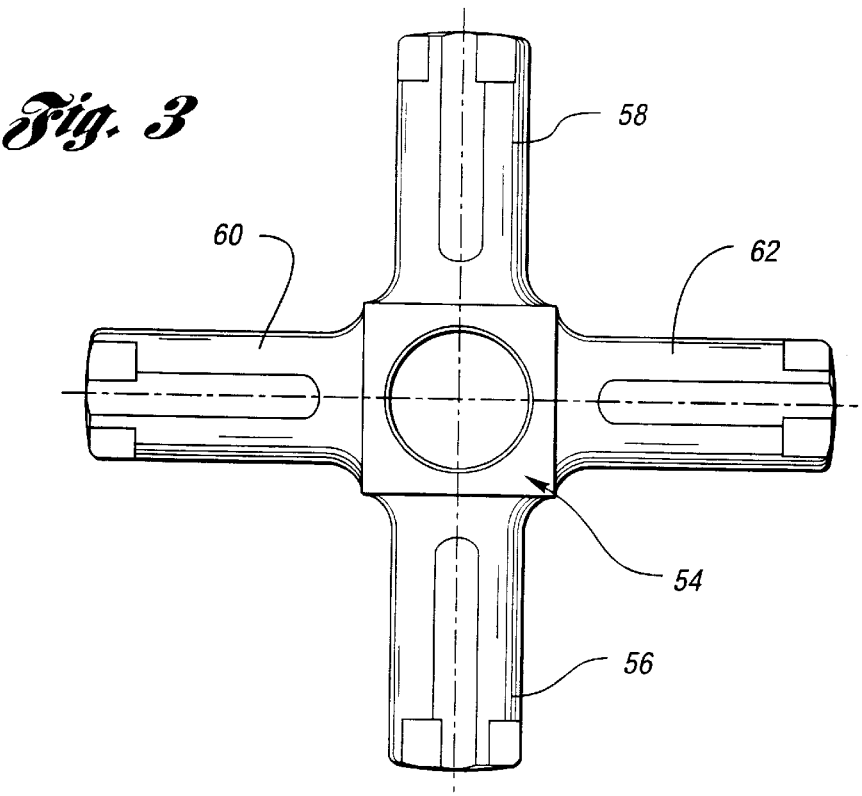
FIG. 3 is a detail view of the cross pins for journaling the differential pinions of the differential mechanism shown in FIG. 1.

Bevel pinions drivably engage the side gears 18 and 20. Preferably there are four pinions, two of which are shown in FIG. 1 at 50 and 52. A cross pin or spider member 54 has bearing spindle shafts, as best seen in FIG. 3. The spindle shaft for pinion 50 is shown in FIG. 3 at 56 and the corresponding spindle shaft for pinion 52 is shown in FIG. 3 at 58. Two other spindle shafts shown at 60 and 62 in FIG. 3 journal two other pinions, not shown in FIG. 1. These also drivably engage side gears 18 and 20.

Figure 1A:
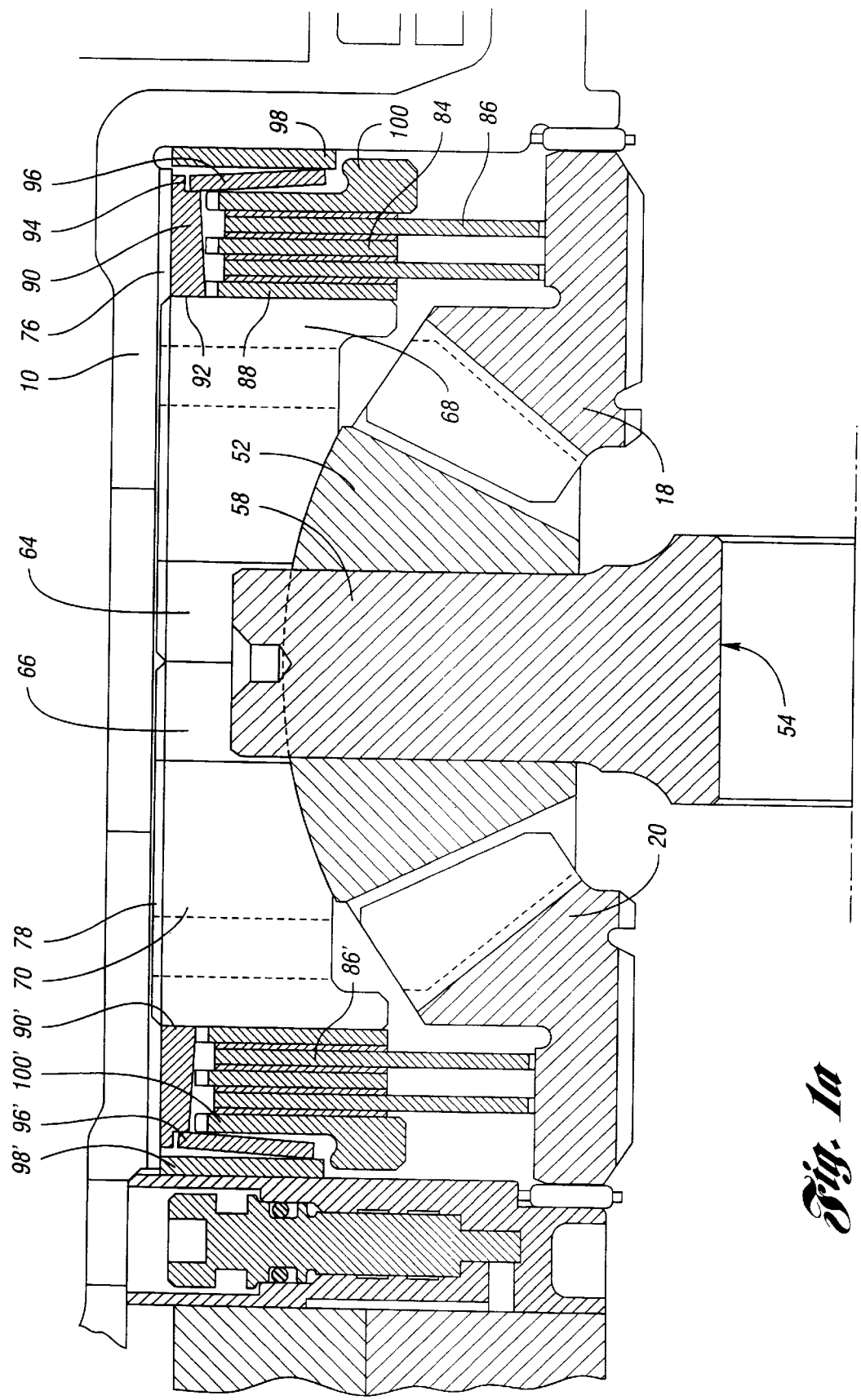
FIG. 1a is a partial cross-sectional view showing portions of the clutch structure illustrated in the assembly view of FIG. 1, the details of the clutch structure being enlarged, the sectional plane of FIG. 1a being viewed from a vantage point that is opposite the vantage point of FIG. 1.

As seen in FIG. 1a, the spindle shaft 58 for pinion 52 extends radially outward so that it engages a set of ramps shown at 64 and 66. Ramp 64 is formed in pressure ring 68, seen in FIG. 2. Ramp 66 is formed in a companion pressure ring 70, also seen in FIG. 2. The ramps 64 and 66 are defined by a radial opening that receives the end of spindle shaft 58. Corresponding ramps are formed in the pressure rings 68 and 70 so that they cooperate with the three other spindle shafts 56, 60 and 62. When an accelerating torque is applied to the carrier housing 10 by the differential crown gear or differential bevel input gear, the spindle shaft 58 engages the ramps 64 and 66, thereby creating an axial thrust on the pressure rings 68 and 70. This tends to separate the pressure rings. This axial thrust creates axial shifting movement of each pressure ring relative to the carrier housing. The pressure ring 68 is splined to the carrier housing, the external spline teeth of pressure ring 68 being shown at 72. The corresponding spline teeth for pressure ring 70 are shown at 74. These splined teeth drivably engage internal splined teeth formed in carrier housing 10 as shown in FIG. 1a at 76 and 78, respectively.

Figure 2:
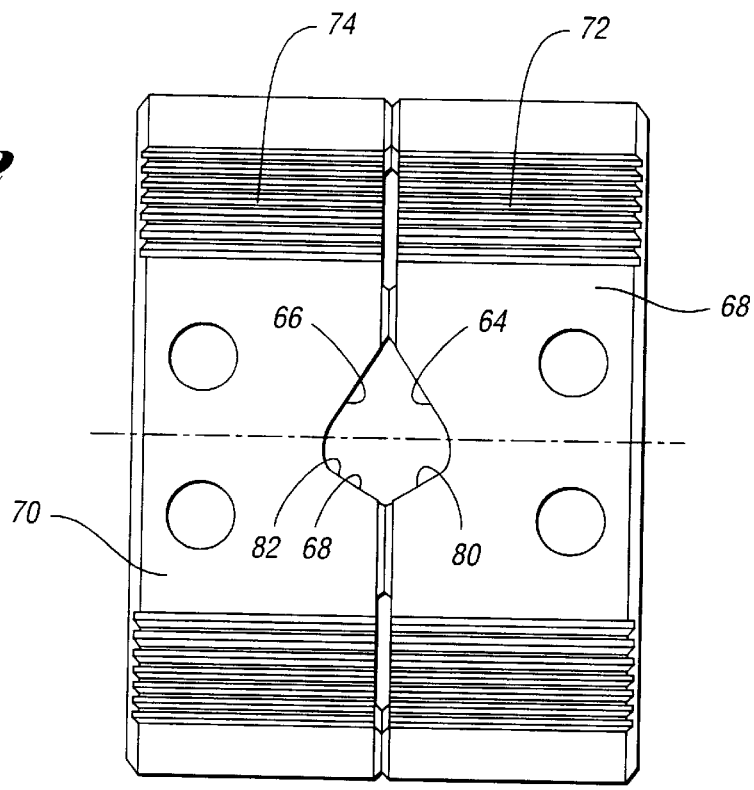
FIG. 2 is a side elevation view of the pressure rings used in the assembly of FIG. 1.

The opening in the pressure plates that define the ramps 64 and 66 define also a second set of ramps, as seen in FIG. 2 at 80 and 82. The ramps 80 and 82 are formed with a steeper angle than the angle of the ramps 64 and 66. In a typical embodiment, the angle of the ramps 64 and 66 may be 30° relative to a normal transverse reference plane, whereas the angle of the ramps 80 and 82 may be 60°. For a given torque on the differential carrier, the axial thrust created by engagement of the spindle shaft with the ramps 80 and 82 is less than the corresponding thrust created by engagement of the spindle shaft with the ramps 64 and 66. The ramps 80 and 82 are engaged when the carrier housing is subjected to a deceleration torque. This provides a different degree of torque bias in the differential mechanism during coasting of the vehicle than the torque bias that is present during acceleration.

The spline connection between the pressure rings and the carrier housing permits the pressure rings to shift into engagement with friction disks as best seen in FIG. 1a. A first friction disk clutch assembly 84 comprises internally splined clutch disks 86, which are drivably connected by a spline connection with differential side gear 18.

Friction clutch separator plates 88 are externally splined to internally splined sleeve 90. One end 92 of the sleeve 90 engages the pressure ring 68. The opposite end 94 of the sleeve 90 engages the radially outward margin of Belleville spring washer 96. The radially inward margin of the washer 96 engages a shim ring 98 of selected thickness.

A pressure reaction ring 100 is situated between the Belleville spring washer 96 and the friction clutch assembly. In the embodiment shown in FIG. 1a, reaction ring 100 is engageable with friction disc 86. Reaction ring 100, like the separator plates 88, is splined to the internal spline teeth of the sleeve 90.

The friction clutch assembly for side gear 20 is illustrated in FIG. 1a on the opposite side of the cross pin 54. The elements of the friction clutch for the side gear 20 that have a counterpart in the clutch assembly for the side gear 18 have been designated by similar reference numerals, although prime notations are used.

Figure 4:
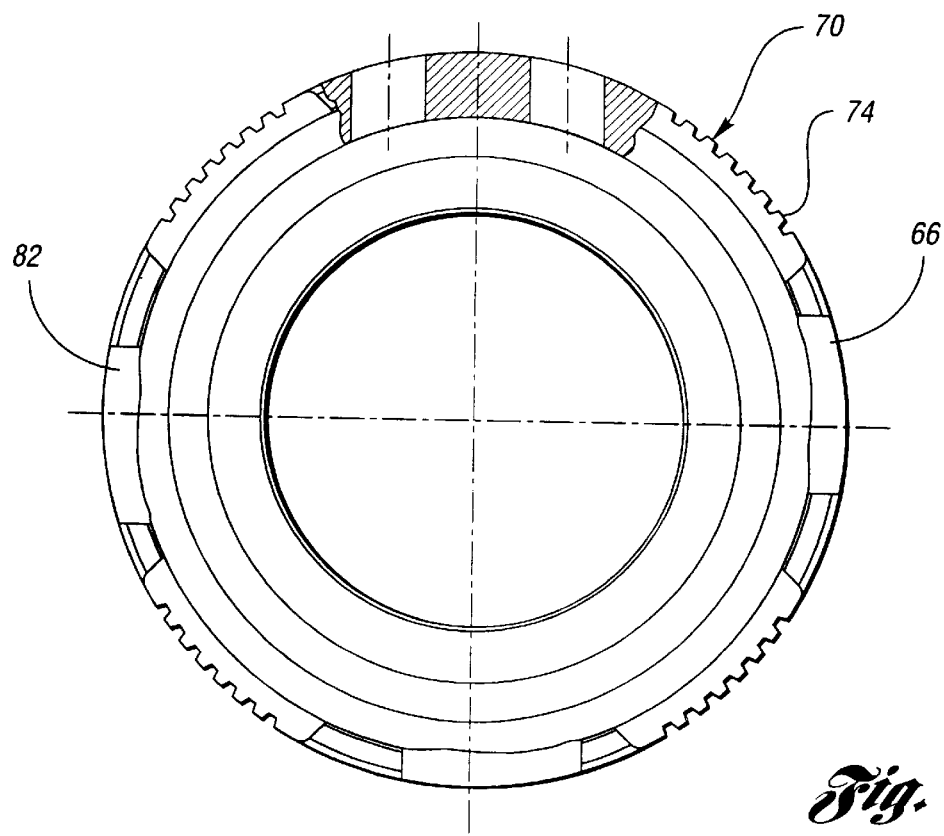
FIG. 4 is an end view of one of the pressure rings shown in FIGS. 1, 1a, and 2.

FIG. 4 shows the ramps 66 and 82 for the pressure ring 70. The corresponding ramps for the pressure ring 68 would be similar to those illustrated in FIG. 4. The internal spline in the carrier housing 10 that engage the teeth 74 of the pressure ring 70, as seen in FIG. 4, preferably is the same spline that forms a driving connection between the carrier housing 10 and the sleeve 90.

Figure 6:
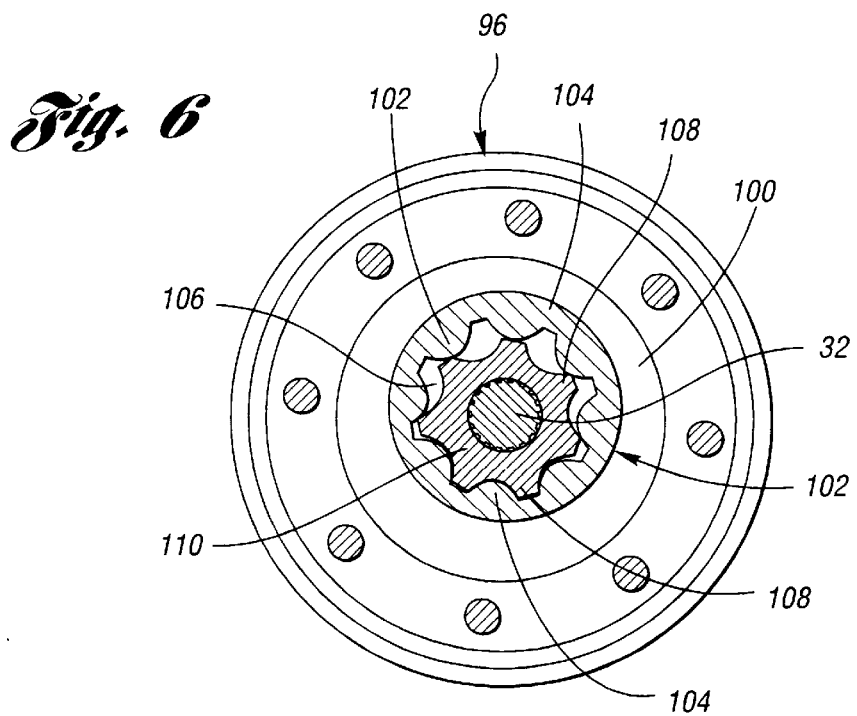
FIG. 6 is a cross-sectional view of a positive displacement pump used in the assembly of FIG. 1 as seen from the plane of section line 6—6 of FIG. 1.

The differential mechanism illustrated in FIG. 1 includes a hydrostatic torque bias feature. This feature is achieved by a positive-displacement pump 102, which comprises a pair of Gerotor pumping elements. These elements are shown in FIG. 6. The outer pumping element 104 of the pump 102 has internal Gerotor tooth spaces 106 that register with external Gerotor pump teeth 108 formed on companion pumping element 110. The spacing between the external Gerotor teeth of the element 110 and the internal tooth spaces of the pumping element 104 define pumping chambers that communicate with the pump port 112 and pump port 114, one pump port acting as the pump inlet and the other acting as the pump outlet, depending upon the direction of the relative rotation of the pumping elements 104 and 110. These ports are best seen in FIG. 7.

Figure 7:
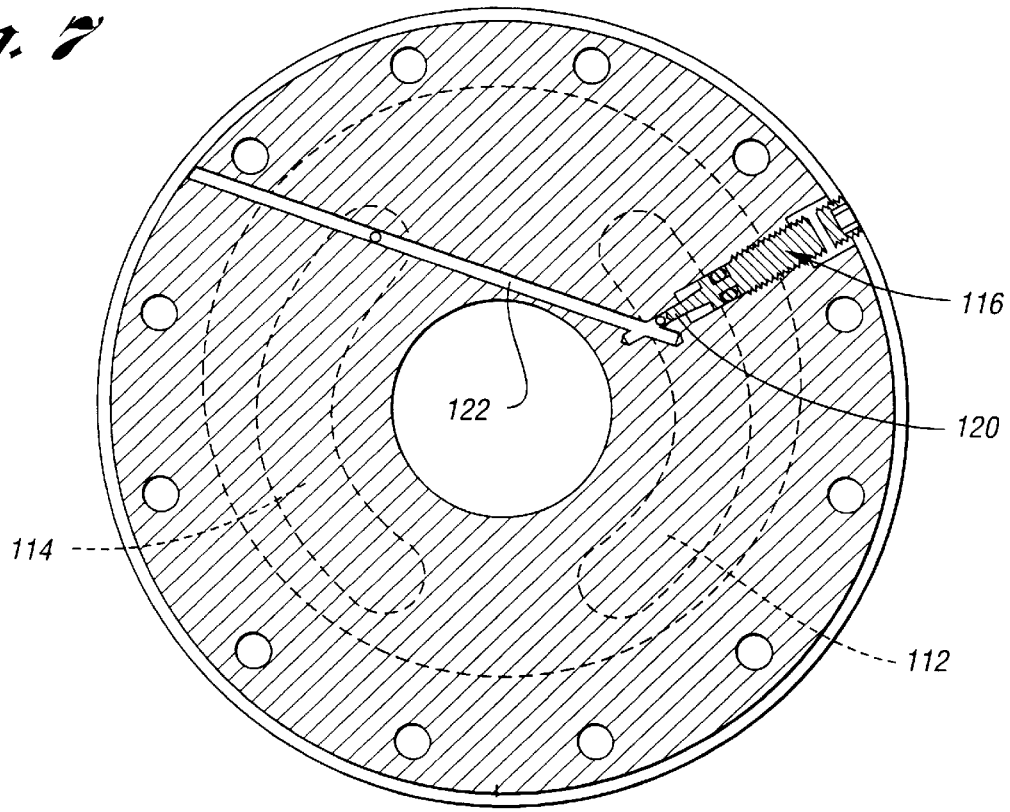
FIG. 7 is a detailed cross-sectional view of the flow restricting valve for the pump shown in FIG. 6, as seen from the plane of section line 7—7 of FIG. 1.

A flow control valve 116 is in end plate 118 for the carrier housing 10, as best seen in FIG. 7. The ports 112 and 114 also are formed in end plate 118. The flow control valve 116 has a flow restricting element 120 at the inward end of the threaded valve body. The element 120 controls flow of fluid through cross-passage 122 from the inlet port to the outlet port. Relative motion of the differential carrier with respect to the side gear 20 will create a pumping motion of the pumping element 104 and 108 for the pump 102. This introduces a hydrostatic torque bias. This hydrostatic torque bias feature is fully described in application Ser. No. 09/114,505, filed Jul. 13, 1998, which is assigned to the assignee of the present invention. That description in the copending patent application is incorporated in this disclosure by reference.

Figure 5:
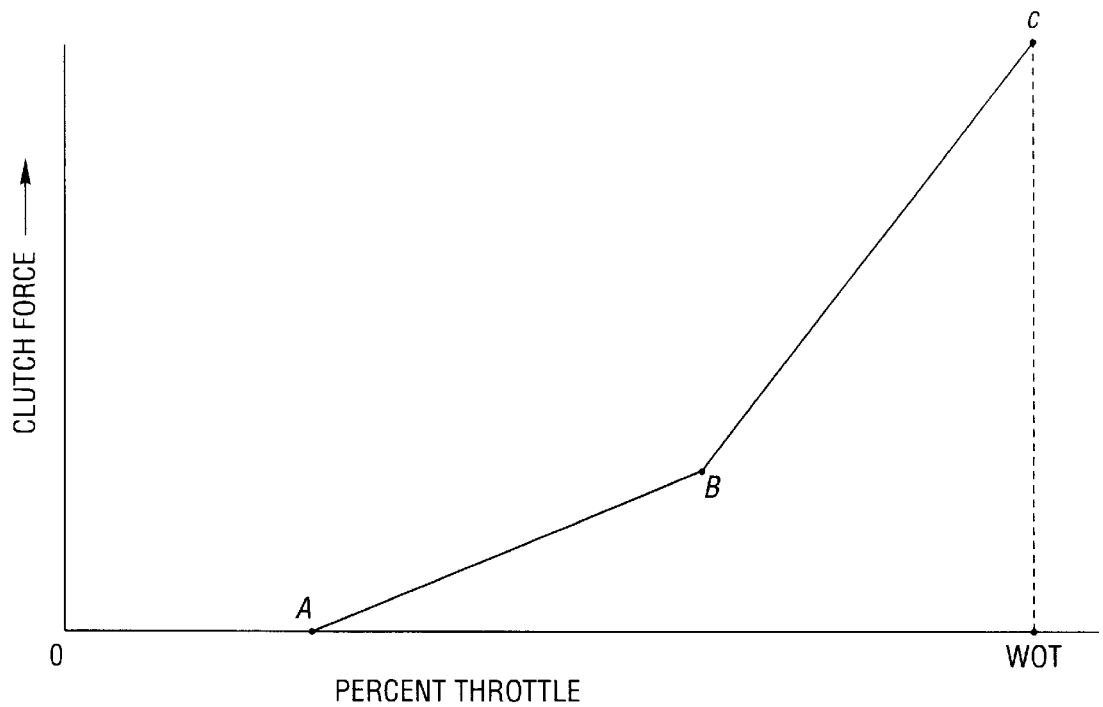
FIG. 5 is a plot of the clutch force acting on the clutches of the differential mechanism shown in FIG. 1 for various engine throttle settings between zero throttle position and wide-open throttle position.

When torque is applied to the differential carrier, the axial separating force on the pressure rings 68 and 70 will be resisted initially by the preload on the spring 96. When the axial separating force equals the preload of the spring 96, a friction torque bias is developed in the clutches. This characteristic is illustrated in FIG. 5 where clutch force is plotted against a percent of throttle opening for the engine throttle. For engine throttle settings between zero and point A, the separating force is not equal to the preload. At point A, the separating force on the pressure rings is equal to the preload. Further increase in throttle setting, which results in an increase in torque delivered to the carrier housing, will cause a linear increase in the clutch-engaging force at a relatively low rate until the percent throttle setting corresponding to point B is reached. A torque bias is developed by the friction discs of the clutches as the spring 96 yields under the axial load transmitted to it from the pressure rings.

When the percent throttle corresponding to point B is reached, the spring 96 becomes fully bottomed against the shim 98, as seen in FIG. 1a. Upon a further increase in throttle setting, the clutch force, and hence the torque bias, increases at a greater rate represented by the increased scope of the clutch force plot of FIG. 5. At a wide-open throttle setting, the clutch force is represented by point C in FIG. 5.

The Belleville spring, the associated sleeve 90 and pressure plate 100 develop a torque bias delay during acceleration of the vehicle. This reduces the tendency of the vehicle to understeer during turns as the vehicle engine throttle is advanced. The tailoring of the delay and the tailoring of the rate of increase in torque bias can be controlled by appropriately choosing the characteristics of the spring 96.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of the invention.

What is claimed is:

1. A geared differential mechanism for a wheeled vehicle having a torque input gear and two side gears for distributing torque to each of two driven members, the driven members being coaxially aligned, one driven member being connected to one side gear and the other driven member being connected to the other driven member;

at least one planetary pinion engaging drivably each side gear;

a differential carrier housing rotatably supporting the pinion, the torque input gear being drivably connected to the differential carrier housing;

a pair of friction disc clutch packs, each pair having a first disc secured drivably to the differential carrier housing and a second disc secured drivably to one of the side gears;

a pair of pressure rings in the carrier housing, one pressure ring surrounding the one side gear, a cam in the one pressure ring defining a ramp surface, the one planetary pinion being located axially adjacent the cam;

axial thrust force acting on the one side gear being transmitted through the one pressure ring to the clutch pack for the one side gear thereby developing a friction torque bias in the differential mechanism; and a spring in the differential carrier housing acting on the one pressure ring to oppose the axial thrust force on the one side gear;

the spring delaying the development of the friction torque bias as torque of the torque input gear increases whereby unrestricted differential motion of the side gears is effected until a threshold thrust force on the one pressure ring is achieved.

2. A differential mechanism with limited slip capabilities for transferring torque from a driving member to first and second driven members;

first and second coaxial side gears connected respectively to the first and second driven members;

at least two planetary pinions engaging drivably each of the side gears, the planetary pinions being journalled on a common pinion shaft;

a differential carrier housing enclosing the side gears and the planetary pinions;

a pair of friction disk clutch packs, each pair having a first disk secured to the differential carrier housing and a second disk secured to one of the driven members;

a pair of pressure rings in the differential carrier housing, one pressure ring surrounding the one side gear, a cam recess in the one pressure ring defining a ramp surface, the one planetary pinion being disposed axially adjacent the ramp surface;

axial thrust forces acting on the one side gear being transferred through the one pressure ring to the one clutch pack for the one side gear thereby creating a torque-sensitive bias in the differential mechanism;

a sleeve with an outer surface secured to the differential carrier housing and an inner surface secured to friction elements of the clutch pack, said sleeve being axially shiftable in the direction of the axis of the one side gear; and a spring in the differential carrier housing, the spring being engaged by the sleeve of the clutch pack and acting on the clutch pack to oppose the axial thrust force on the one side gear;

the spring being deflected by thrust force acting on the one side gear, thereby creating a friction torque bias that increases at a first rate as thrust force increases to a first value;

the spring being fully deflected as thrust force acting on the one side gear increases to a value greater than the first value, the rate of increase of torque bias upon an increase in the thrust force to values greater than the first value being greater than the first rate.

3. The differential mechanism as set forth in claim 2 wherein the clutch pack includes a reaction ring between the clutch pack friction discs and the differential carrier housing, the clutch pack friction discs being bottomed out against the reaction ring when the thrust force exceeds the first value.

4. The differential as set forth in claim 1 wherein each clutch pack includes a reaction ring between the clutch pack discs and the differential carrier housing, the reaction ring being bottomed out against the differential carrier housing when the spring is fully deflected, the clutch pack thereby creating a torque-sensitive torque bias that increases at a predetermined rate between predetermined values of the axial thrust force.

5. The differential mechanism as set forth in claim 4 wherein the spring is located between the reaction ring and the differential carrier housing and a shim of predetermined thickness between the spring and the differential carrier housing whereby a controlled delay is established for the start of development of the torque bias as axial thrust force on the clutch pack increases.

6. The differential mechanism set forth in claim 3 wherein the spring is located between the reaction ring and the differential carrier housing, and a shim of predetermined thickness between the spring and the differential carrier housing whereby a controlled delay is established for the start of development of the torque bias as axial thrust force on the clutch pack increases.

7. The differential mechanism as set forth in claim 1 wherein the spring is located between the reaction ring and the differential carrier housing, the spring being spaced from the differential carrier housing a predetermined amount whereby a controlled delay is established for the start of development of the torque bias as axial thrust force on the clutch pack increases.

8. The differential mechanism as set forth in claim 3 wherein the spring is located between the reaction ring and the differential carrier housing, the spring being spaced from the differential carrier housing a predetermined amount whereby a controlled delay is established for the start of development of the torque bias as axial thrust force on the clutch pack increases.

* * * * *